Sept. 15, 1953
R. W. WEEKS
2,652,274
ROD JOINT OR COUPLING
Filed Oct. 12, 1949
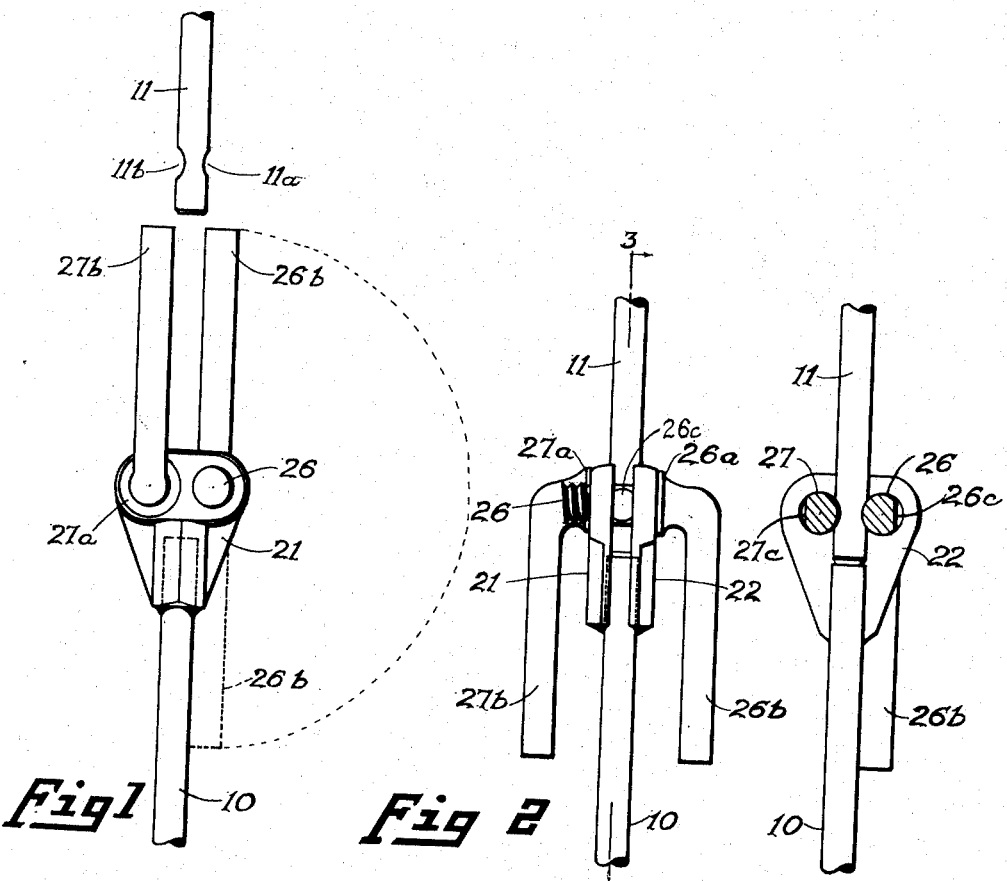
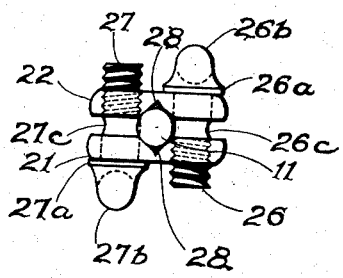
INVENTOR.
Robert W. Weeks
BY
Ralph B. Stewart
Attorney Patented Sept. 15, 1953

2,652,274

UNITED STATES PATENT OFFICE 2,652,274

ROD JOINT OR COUPLING

Robert W. Weeks, West Chester, Pa., assignor to Wind Turbine Company, a corporation of Pennsylvania Application October 12, 1949, Serial No. 120,925

4 Claims. (Cl. 287—119)

This invention relates to a coupling device for use in joining two sections of rod. The coupling is particularly useful for equipment that must be easily assembled or disassembled, such as portable towers.

A primary object of the invention is to provide a coupling which may be assembled or disassembled without the use of tools of any kind.

Another object is to provide a coupling which securely locks the rod sections together and provides a high degree of rigidity in the completed joint.

Another object is to provide a coupling that may be easily assembled or disassembled under adverse conditions such as severe cold.

Still another object is to provide a coupling of extremely simple and rugged construction that is well adapted to economical manufacture.

The accompanying drawing illustrates a preferred form of the invention in which:

Figure 1 is a side elevational view of the coupling in the unlocked position and with the rod about to be inserted therein;

Figure 2 is a side view of Figure 1 showing the coupling in locked position;

Figure 3 is a sectional view of Figure 2 taken along the line 3—3 but showing the rod sections in elevation; and Figure 4 is a plan view of the completed joint.

Referring to the drawing, 10 is a section of rod having the coupling fixed to one end thereof, and 11 is the rod section which is to be joined to rod 10 by means of the coupling.

In the form illustrated in the drawing the coupling comprises four parts, two clamping jaws or plates 21 and 22 which are securely fastened by suitable means, preferably by welding or brazing, to one end of rod 10, and two clamping screws 26 and 27. If desired, the two screws, and the two clamping plates, may be identical; however, in the illustrated form screw 26 has a left-hand thread while screw 27 has a right-hand thread. This is to enable both the clamping screws to be moved or turned in the same direction to lock or unlock the coupling. The clamping jaws 21 and 22 have aligned pairs of holes for receiving screws 26 and 27, one hole in jaw 21 being tapped with a left-hand thread and one hole in jaw 22 being tapped with a right-hand thread. The distance between the circumferences of these holes is somewhat less than the diameter of the rod 11 and they are positioned on opposite sides of the center line of rod 10.

Each of the clamping jaws 21 and 22 has a V-shaped groove 28 formed on the inside face thereof and extending between the holes formed therein. These plates are welded to the rod 10 with the end portion of the rod in the channel formed by the grooves 28 and with the screw holes in alignment. The rod 10 fills only the lower half of the channel formed by grooves 28, the upper half-portions of clamping plates 21 and 22 being supported in spaced relation, as shown in Figure 2, so that the upper part of the channel forms a socket for receiving the lower end of rod section 11.

Clamping screws 26 and 27 are provided with enlarged shoulders or flanges 26a and 27a which seat against the outer faces of plates 22 and 21, respectively, and these screws are also provided with handle portions 26b and 27b attached to the shoulders and extending at right angles to the screws.

The screws 26 and 27 are provided on their shank portions with two flat faces 26c and 27c arranged in such a position that when the handle portions are turned to an upwardly pointing position (see Figure 1) the rod 11 may be inserted in the channel formed by the grooves 28 and abutted with the end of rod 10 without interference from screws 26 and 27. Rounded notches 11a and 11b are formed on opposite sides of rod 11 and in a position to receive the un-notched shank portions of clamping screws 26 and 27. Thus by turning the screw handles through an arc of approximately 180°, the rod 11 is locked within the coupling and is held against axial movement.

Simultaneously with the rotation of the screw handles from the upwardly pointing direction to the downwardly pointing (or locking) position, the threads of the screws draw the shoulders 26a and 27a against the outer faces of plates 22 and 21, thus drawing these plates together and firmly clamping rod 11 between them. This clamping action produces a joint having a high degree of rigidity.

It is obvious that the coupling just described is not the only form that the invention may take. Instead of forming the support plates as two separate members they could be made in the form of a single member having a split upper portion. As previously mentioned, the clamping members may have right- and left-hand threads, or both may have the same kind of thread; the clamping members could also be mounted with the handle portions on the same side of the coupling instead of on opposite sides. These and other modifications within the scope of the invention will occur to those skilled in the art.

What I claim is:

1. A rod joint comprising one rod having notches formed therein on opposite sides thereof adjacent one end thereof, a second rod, two clamping plates each having a V-notch in one face thereof, said plates being attached to said second rod with said V-notches forming a recess for said first rod, and two clamping screws each having a flat face formed in the shank portion thereof and an enlarged shoulder on the opposite side of said flat face from the threaded end portion, each clamping screw being freely rotatably disposed through a hole in one clamping plate and having threaded engagement with the opposite clamping plate so that said first rod may be inserted in said recess and pass between said screws when said flat faces are facing each other, and said screws being arranged so that said notches will be engaged by said shank portions and said clamping plates will be forced together by said shoulders when said clamping screws are rotated.

2. A rod joint according to claim 1 wherein one of said screws is provided with a right-hand thread and the other with a left-hand thread.

3. A rod joint comprising a first rod having a notch formed in the side thereof adjacent one end, a second rod, a split clamping member mounted on one end of said second rod and having a socket for receiving said first rod, and a clamping screw threaded transversely of said clamping member, said screw being freely rotatable through one of the halves of said clamping member and having threaded engagement with the other half thereof, and having a recess formed in one side of its shank to allow the insertion of said first rod into said socket, said screw having an enlarged shoulder for engaging said one half of said clamping member to draw the halves of the split clamping member into tight engagement with said first rod, said recess being formed on said screw at a point such that it is positioned outside of said socket when the halves of said clamping member are in tight engagement with said first rod.

4. A rod joint comprising two rod sections arranged in vertical alignment, the upper rod section having notches formed therein on opposite sides thereof adjacent its lower end, a coupling member secured to the upper end of the lower rod section and having a split socket for receiving the lower end of the upper rod section, two clamping screws each having a threaded end portion and an enlarged shoulder spaced from said threaded portion, each screw having a flat face formed on one side thereof between said threaded portion and said shoulder, each screw having a handle portion on the opposite side of said shoulder and extending at right angles to the axis of the threaded portion and parallel with said flat face, each clamping screw being freely rotatably disposed through a hole in one part of said split socket member and having threaded engagement with the opposite part of said socket member, said screws being arranged so that when said handle portions extend vertically upward, said flat face portions face towards said socket to permit insertion of the upper rod section into said socket, and said screws being operative upon moving said handle portions to a downward extending position to interlock the shank portions of said screws with the notches in the upper rod section and the parts of said split coupling member are clamped into tight engagement with said upper rod section.

ROBERT W. WEEKS.

References Cited in the file of this patent

UNITED STATES PATENTS

| Number | Name | Date |
|---|---|---|
| 78,827 | Porter | June 9, 1868 |
| 757,498 | Robbins | Apr. 19, 1904 |
| 1,153,789 | Hopkins | Sept. 14, 1915 |
| 1,197,333 | Benner | Sept. 5, 1916 |
| 1,935,850 | Lawson | Nov. 21, 1933 |
| 1,954,049 | Jeffrey | Apr. 10, 1934 |

FOREIGN PATENTS

| Number | Country | Date |
|---|---|---|
| 165,672 | Great Britain | of 1921 |